(12) United States Patent
Liang

(10) Patent No.: US 12,170,948 B2
(45) Date of Patent: Dec. 17, 2024

(54) ACCESS POINT, AND METHOD, MEDIUM, AND COMPUTER PROGRAM PRODUCT FOR ACCESS POINT

(71) Applicant: ARRIS Enterprises LLC, Suwanee, GA (US)

(72) Inventor: Jianming Liang, Guangdong (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 342 days.

(21) Appl. No.: 17/721,603

(22) Filed: Apr. 15, 2022

(65) Prior Publication Data

US 2023/0010677 A1    Jan. 12, 2023

(30) Foreign Application Priority Data

Jul. 7, 2021 (CN) .......................... 202110770200.5

(51) Int. Cl.
*H04W 48/02* (2009.01)
*H04W 12/06* (2021.01)
(Continued)

(52) U.S. Cl.
CPC ........... *H04W 48/02* (2013.01); *H04W 12/06* (2013.01); *H04W 24/04* (2013.01); *H04W 88/10* (2013.01)

(58) Field of Classification Search
None
See application file for complete search history.

(56) References Cited

U.S. PATENT DOCUMENTS 10,165,448 B2 * 12/2018 Howard ................. H04L 63/08
2009/0074215 A1   3/2009 Schumaier
(Continued)

FOREIGN PATENT DOCUMENTS

WO   2013/083752   6/2013
WO   2013/087723   6/2013

OTHER PUBLICATIONS

International Search Report and Written Opinion of the International Searching Authority issued Jul. 8, 2022 in International (PCT) Application No. PCT/US2022/025018.
(Continued)

*Primary Examiner* — Kenneth B Wells
(74) *Attorney, Agent, or Firm* — Wenderoth, Lind & Ponack, L.L.P.

(57) ABSTRACT

The present disclosure relates to an access point, a method, a medium, and a computer program product for the access point. An access point is configured to perform at least the following processing: in response to an association request received from a user station, checking a first access control list set by a user to determine whether the user station is set by the user as a user station that is to be refused access to the access point; in response to determination that the user station is set by the user as a user station that is to be refused access to the access point, determining whether a push button configuration mode of a wireless protection setup of the access point is activated and verifying whether the association request is related to the push button configuration mode; and in response to determination that the push button configuration mode of the access point is activated and the association request of the user station is related to the push button configuration mode, sending an association response to the user station to complete a network configuration process of the user station.

17 Claims, 6 Drawing Sheets

(51) Int. Cl.
*H04W 24/04* (2009.01)
*H04W 88/10* (2009.01)

(56) References Cited

U.S. PATENT DOCUMENTS

2011/0223912 A1* 9/2011 Nasielski .............. H04W 12/08
 455/435.1
2016/0192191 A1* 6/2016 Lee ....................... H04L 63/083
 726/7

OTHER PUBLICATIONS

International Preliminary Report on Patentability issued Dec. 14, 2023 in International (PCT) Application No. PCT/US2022/025018.

* cited by examiner

ACCESS POINT, AND METHOD, MEDIUM, AND COMPUTER PROGRAM PRODUCT FOR ACCESS POINT

TECHNICAL FIELD

The present disclosure relates to a field of access points, and in particular to communication between an access point and a user station.

BACKGROUND ART

A user station (hereinafter referred to as STA for short) is connected to an access point (hereinafter referred to as AP for short) to realize wireless network access. In order to connect the STA to the AP, network configuration of the STA is required first. An exemplary network configuration process is as follows: (1) Probe process: the STA sends a probe request to the AP, and the AP feeds back a probe response to the STA; (2) Authentication process: the STA sends an authentication request to the AP, and the AP feeds back an authentication response to the STA; (3) Association process: the STA sends an association request to the AP, and the AP verifies the association request and sends an association response to the STA; (4) Subsequent configuration process: a network name and a password used to connect to the AP are obtained by the STA through information exchange between the STA and the AP. As a result, the network configuration process of the STA is completed, and then the STA may use the obtained network name and password to connect to the AP, thereby realizing wireless network access through the AP.

Some APs can provide access control functions. For example, a user may enable the access control function of an AP and set an access control list (ACL) to only allow a specific STA to connect to the AP, or prevent a specific STA from connecting to the AP. Specifically, for example, the user may set the ACL of the AP as a whitelist mode and set a MAC (Media Access Control) address of an STA that is allowed to access the AP in the ACL. When the AP receives an access request (for example, a probe request, an authentication request, or an association request) from an STA, the AP determines whether the MAC address of the STA exists in the ACL set by the user. If yes, the AP approves the request of the STA. If no, the AP rejects the request of the STA. On the other hand, for example, the user may set the ACL of the AP as a blacklist mode and set a MAC address of an STA that is not allowed to access the AP in the ACL. When the AP receives an access request from an STA, the AP determines whether the MAC address of the STA exists in the ACL set by the user. If yes, the AP rejects the request of the STA. If no, the AP approves the request of the STA.

SUMMARY OF THE INVENTION

The inventors of the present disclosure have noticed that although an AP provides an access control function to enable users to flexibly configure an ACL according to their own needs, the users may have not been properly configuring the ACL in some cases. For example, a user may configure an ACL as a whitelist mode while only adding a very small number of STAs in the ACL, resulting in a large number of STAs being unable to connect to the AP. In an extreme case, the user may have not added any STA to the ACL in the whitelist mode, making it impossible for any STA to be able to connect to the AP, which may adversely affect the user experience. In addition, for some STAs (for example, household electric appliances such as a refrigerator and an air conditioner in the user's home, or a wireless extender used to extend wireless coverage of the AP, etc.), the user may hope that the AP can automatically configure the MAC addresses of these STAs as a whitelist so as to always allow these STAs to access the AP, thereby avoiding a complicated operation of manually adding the MAC addresses.

The present disclosure is made in view of one or more of the above problems, and provides an access point, and a method, a medium, and a computer program product for the access point, which allow at least some STAs to access an AP through a push button configuration (PBC) mode of a wireless protection setup (WPS) of the access point, no matter whether these STAs are included in an ACL set by a user. As a result, the flexibility and convenience of the AP connection can be improved and user experience can be enhanced.

According to an aspect of the present disclosure, an access point is provided, and the access point comprises: a memory on which instructions are stored; and a processor configured to execute instructions stored on the memory to perform at least the following processing: in response to an association request received from a user station, checking a first access control list set by a user to determine whether the user station is set by the user as a user station that is to be refused access to the access point; in response to determination that the user station is set by the user as a user station that is to be refused access to the access point, determining whether a push button configuration mode of a wireless protection setup of the access point is activated and verifying whether the association request is related to the push button configuration mode; and in response to determination that the push button configuration mode of the access point is activated and the association request of the user station is related to the push button configuration mode, sending an association response to the user station to complete a network configuration process of the user station.

In some embodiments, the processor is further configured to execute instructions stored on the memory to perform at least the following processing: in response to a probe request received from the user station, checking the first access control list to determine whether the user station is set by the user as a user station that is to be refused access to the access point; and in response to determination that the user station is set by the user as a user station that is to be refused access to the access point, sending a probe response to the user station in a case where the push button configuration mode of the access point is activated.

In some embodiments, the processor is further configured to execute instructions stored on the memory to perform at least the following processing: in response to an authentication request received from the user station, checking the first access control list to determine whether the user station is set by the user as a user station that is to be refused access to the access point; and in response to determination that the user station is set by the user as a user station that is to be refused access to the access point, sending an authentication response to the user station in a case where the push button configuration mode of the access point is activated.

In some embodiments, the processor is further configured to execute instructions stored on the memory to perform at least the following processing: adding the user station which has completed the network configuration process to a second access control list; and allowing a user station in the second access control list to perform a connection process to the access point.

In some embodiments, the processor is further configured to execute instructions stored on the memory to perform at least the following processing: modifying the first access control list according to the second access control list.

In some embodiments, the processor is further configured to execute instructions stored on the memory to perform at least the following processing: adding a user station in the second access control list to the first access control list in a case where the first access control list is set by the user as a whitelist mode; and deleting a user station in the first access control list that is the same as a user station in the second access control list in a case where the first access control list is set by the user as a blacklist mode.

In some embodiments, the processor is further configured to execute instructions stored on the memory to perform at least the following processing: determining whether the user station belongs to a priority connection station; and sending the association response to the user station only in a case where it is determined that the user station belongs to a priority connection station.

In some embodiments, the processor is further configured to execute instructions stored on the memory to perform at least the following processing: determining whether the user station belongs to a priority connection station; and in response to determination that the user station does not belong to a priority connection station, deleting the user station from the second access control list.

In some embodiments, the priority connection station includes a wireless extender, and the processor is further configured to execute instructions stored in the memory to perform at least the following processing: in a case where an association request of the user station includes a multi access point information element, determining that the user station is a wireless extender belonging to the priority connection station.

In some embodiments, the processor is further configured to execute instructions stored on the memory to perform at least the following processing: in a case where an association request of the user station includes an information element related to the push button configuration mode, or in a case where the association request of the user station does not include an information element related to a robust security network, determining that the association request of the user station is related to the push button configuration mode.

According to another aspect of the present disclosure, a method for an access point is provided, and the method includes: in response to an association request received from a user station, checking a first access control list set by a user to determine whether the user station is set by the user as a user station that is to be refused access to the access point; in response to determination that the user station is set by the user as a user station that is to be refused access to the access point, determining whether a push button configuration mode of a wireless protection setup of the access point is activated and verifying whether the association request is related to the push button configuration mode; and in response to determination that the push button configuration mode of the access point is activated and the association request of the user station is related to the push button configuration mode, sending an association response to the user station to complete a network configuration process of the user station.

In some embodiments, the method further includes: in response to a probe request received from the user station, checking the first access control list to determine whether the user station is set by the user as a user station that is to be refused access to the access point; and in response to determination that the user station is set by the user as a user station that is to be refused access to the access point, sending a probe response to the user station in a case where the push button configuration mode of the access point is activated.

In some embodiments, the method further includes: in response to an authentication request received from the user station, checking the first access control list to determine whether the user station is set by the user as a user station that is to be refused access to the access point; and in response to determination that the user station is set by the user as a user station that is to be refused access to the access point, sending an authentication response to the user station in a case where the push button configuration mode of the access point is activated.

In some embodiments, the method further includes: adding the user station which has completed the network configuration process to a second access control list; and allowing a user station in the second access control list to perform a connection process to the access point.

In some embodiments, the method further includes: modifying the first access control list according to the second access control list.

According to another aspect of the present disclosure, a non-transitory computer-readable medium for use with a processor is provided, wherein the non-transitory computer-readable medium has instructions stored thereon, which, when executed by the processor, perform at least the following processing: in response to an association request received from a user station, checking a first access control list set by a user to determine whether the user station is set by the user as a user station that is to be refused access to an access point; in response to determination that the user station is set by the user as a user station that is to be refused access to the access point, determining whether a push button configuration mode of a wireless protection setup of the access point is activated and verifying whether the association request is related to the push button configuration mode; and response to determination that the push button configuration mode of the access point is activated and the association request of the user station is related to the push button configuration mode, sending an association response to the user station to complete a network configuration process of the user station.

In some embodiments, the instructions, when executed by the processor, also perform at least the following processing: in response to a probe request received from the user station, checking the first access control list to determine whether the user station is set by the user as a user station that is to be refused access to the access point; and in response to determination that the user station is set by the user as a user station that is to be refused access to the access point, sending a probe response to the user station in a case where the push button configuration mode of the access point is activated.

In some embodiments, the instructions, when executed by the processor, also perform at least the following processing: in response to an authentication request received from the user station, checking the first access control list to determine whether the user station is set by the user as a user station that is to be refused access to the access point; and in response to determination that the user station is set by the user as a user station that is to be refused access to the access point, sending an authentication response to the user station in a case where the push button configuration mode of the access point is activated.

In some embodiments, the instructions, when executed by the processor, also perform at least the following processing: adding the user station which has completed the network configuration process to a second access control list; and allowing a user station in the second access control list to perform a connection process to the access point.

In some embodiments, the instructions, when executed by the processor, also perform at least the following processing: modifying the first access control list according to the second access control list.

According to another aspect of the present disclosure, a computer program product is provided, including a computer program, which, when executed by a processor, implements steps of the method according to an embodiment of the present disclosure.

BRIEF DESCRIPTION OF THE ATTACHED DRAWINGS

For a better understanding of the present disclosure and to show how to implement the present disclosure, examples are herein described with reference to the attached drawings, wherein.

It should be noted that throughout the attached drawings, similar reference numerals and signs refer to corresponding parts.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached Claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figures 1, 2:
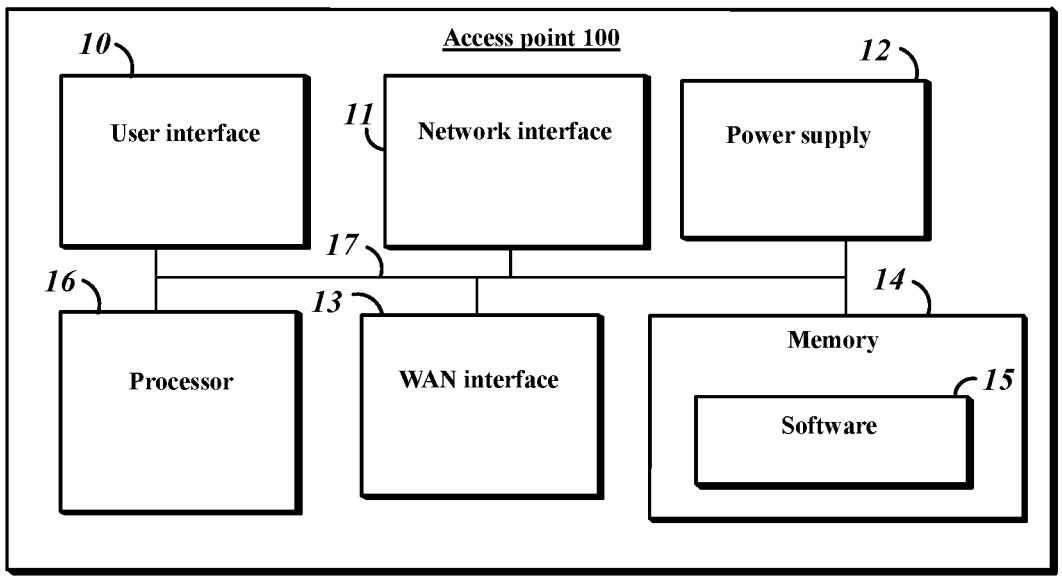
FIG. 1 is a block diagram showing an exemplary configuration of an AP according to an embodiment of the present disclosure.
FIG. 2 is an exemplary flowchart of a method for an AP according to an embodiment of the present disclosure.

FIG. 1 is a block diagram showing an exemplary configuration of an AP 100 according to an embodiment of the present disclosure.

Although it is referred to as an AP herein, the AP 100 may be, for example, a hardware electronic device capable of combining functions of a modem and/or a router. The present disclosure further proposes that the AP 100 may include, but is not limited to, functions of an IP/QAM set-top box (STB) or a smart media device (SMD) that can decode audio/video contents and play contents provided by Over the Top (OTT) or Multi-System Operators (MSO).

As shown in FIG. 1, the AP 100 includes a user interface 10, a network interface 11, a power supply 12, a WAN interface 13, a memory 14, and a processor 16. The user interface 10 may include, but is not limited to, a button, a keyboard, a keypad, and a display device, including a display device with a touch screen capability that enables interaction between a user and other devices. The network interface 11 may include various network cards and a circuit system enabled by software and/or hardware so as to be able to communicate with a wireless extender and a client device using wireless protocols. The wireless protocol is, for example, any IEEE 802.11 Wi-Fi protocol, Bluetooth protocol, Bluetooth Low Energy (BLE) or other short-distance protocols operated in accordance with wireless technology standards, and is used for utilization of any licensed or unlicensed frequency band (for example, the Citizen Broadband Radio Service (CBRS) band, 2.4 GHz band, 5 GHz band, or 6 GHz band), RF4CE protocol, ZigBee protocol, Z-Wave protocol, or IEEE 802.15.4 protocol to exchange data over a short distance.

The power supply 12 supplies power to internal components of the AP 100 through an internal bus 17. The power supply 12 may be a self-contained power source such as a battery pack, with its interface being powered by (for example, directly or through other devices) a charger connected to a socket. The power supply 12 may also comprise a rechargeable battery, which is removable for replacement, for example, a NiCd, NiMH, Li-ion, or Li-pol battery. The WAN interface 13 may comprise various types of network cards and circuit systems realized by software and/or hardware, to realize the communication between a router and an Internet service provider or a multi-system operator (MSO).

The memory 14 includes a single memory or one or more memories or storage locations, including but not limited to a random access memory (RAM), a dynamic random access memory (DRAM), a static random access memory (SRAM), a read-only memory (ROM), an erasable read-only memory (EPROM), an electrically erasable read-only memory (EEPROM), a flash memory, a field programmable gate array (FPGA) logic block, a hard disk, or any other layers of a memory hierarchy. The memory 14 may be used to store any type of instructions, software or algorithms, including software 15 for controlling general functions and operations of the AP 100.

The processor 16 controls the general operations of the AP 100 and executes the administrative functions related to other devices in the network (for example, wireless extenders and client devices). The processor 16 may include, but is not limited to, a central processing unit (CPU), a hardware microprocessor, a hardware processor, a multi-core processor, a single-core processor, a microcontroller, an application-specific integrated circuit (ASIC), a digital signal processor (DSP), or other similar processing devices, which can execute any type of instructions, algorithms, or software for controlling the operations and functions of the AP 100 according to the embodiments described in the present disclosure. The processor 16 may be various realizations of a digital circuit system, an analog circuit system, or a mixed signal (combination of analog and digital) circuit system that executes functions in a computing system. The processor 16 may include, for example, an integrated circuit (IC), a part or circuit of a separate processor core, an entire processor core, a separate processor, a programmable hardware device such as FPGA, and/or a system including a plurality of processors.

The internal bus 17 may be used to establish communication between the components of the AP 100 (for example, 10 to 12, 14 and 16).

In some embodiments, the processor 16 and/or memory 14 of AP 100 can be implemented in a cloud (such as implemented by a cloud processor, a cloud memory), AP 100 connects with the cloud via the network interface 11, and performs data communications with the cloud.

FIG. 2 is a flowchart showing a method 200 for the AP according to an embodiment of the present disclosure. The method 200 may be implemented by the AP 100 described in FIG. 1, wherein each step of the method 200 may be executed by the processor 16 of the AP 100.

As shown in FIG. 2, in step S202, in response to an association request received from a user station (STA), an AP checks a first access control list (ACL) set by a user to determine whether the STA is set by the user as an STA that is to be refused access to the AP.

The STA described in the present disclosure is, for example, any device that can connect with the AP, including but not limited to client devices and wireless extenders.

The first ACL described in the present disclosure is, for example, an access control list set by a user through a user interface or the like provided by the AP, and is used to control access of the STA to the AP (for example, a network configuration process of the STA, and a connection process after the network configuration is completed). The first ACL may be flexibly set according to the user's needs. For example, information used to identify the STA set by the user, such as a MAC address of the STA or other information capable of identifying the STA may be stored in the first ACL. Hereinafter, when it is described that an STA is included in the ACL, it may mean that the MAC address of the STA is included in the ACL, for example.

In some embodiments, the user may set the first ACL as a whitelist mode. In the whitelist mode, all STAs included in the first ACL are allowed to access the AP. In some other embodiments, the user may set the first ACL as a blacklist mode. In the blacklist mode, all STAs included in the first ACL are denied for an access to the AP. Hereinafter, description will be made mainly using an example of the first ACL being in the whitelist mode. However, when the first ACL is in the blacklist mode, all embodiments of the present disclosure can also be similarly applied.

An access process of the STA to the AP may include, for example, the network configuration process of the STA and the connection process of the STA to the AP after the network configuration is completed. The network configuration process may include, for example, a probe process, an authentication process, an association process, and a subsequent configuration process. In a network configuration process of an STA known to the inventors of the present disclosure, when an AP receives an association request from an STA, the AP checks the first ACL and determines whether the STA is set by the user as an STA that is to be refused access to the AP. For example, the first ACL is set to the whitelist mode, and the AP checks whether the STA exists in the first ACL. If the STA does not exist in the first ACL, it is determined that the STA is set by the user as an STA that is to be refused access to the AP, and thus the AP rejects an association request of the STA and ends the network configuration process. The AP approves the association request of the STA and feeds back an association response to the STA only when it is determined that the STA exists in the first ACL.

However, the inventors of the present disclosure have noticed that the users may have not been properly configuring the first ACL in some cases. For example, a user may configure the first ACL as the whitelist mode while only adding a very small number of STAs in the first ACL, resulting in a large number of STAs being unable to connect to the AP. In an extreme case, the user may have not added any STA to the first ACL in the whitelist mode, making it impossible for any STA to be able to connect to the AP, which may adversely affect the user experience. In addition, for some STAs (for example, household electric appliances such as a refrigerator and an air conditioner in the user's home, or a wireless extender used to extend wireless coverage of the AP, etc.), the user may hope that the AP can automatically configure the MAC addresses of these STAs as a whitelist so as to always allow these STAs to access the AP, thereby avoiding a complicated operation of manually adding the MAC addresses.

In view of the above situations, in the present disclosure, in step S204, in response to determination that the STA is set by the user as an STA that is to be refused access to the AP (for example, the STA is not included in the first ACL in the whitelist mode), the AP determines whether a push button configuration (PBC) of a wireless protection setup (Wi-Fi Protected Setup, WPS) of the AP is activated and verifies whether the association request is related to the PBC mode of the AP.

Next, in step S206, in response to determination that the PBC mode of the AP is activated and the association request of the STA is related to the PBC mode, the AP sends an association response to the STA to complete the network configuration process of the STA.

After the STA receives the association response from the AP, the STA may perform the subsequent configuration process (for example, WPS procedure). Through information exchange between the STA and the AP, the STA obtains the network name and password used to connect to the AP. As a result, the network configuration process of the STA is completed. Then, the STA may use the obtained network name and password to connect to the AP, thereby realizing wireless network access through the AP.

The PBC mode of the WPS described above is a connection mode of the AP, where no password is required for connection authentication and the connection between the STA and the AP can be triggered simply by activating the PBC mode (for example, pressing the WPS button on the AP) of the AP.

According to the present disclosure, in the case where the user sets the STA as an STA that is to be refused access to the AP, the AP does not directly reject the association request of the STA, but rather further determines whether the PBC mode of the AP is activated (for example, the WPS button on the AP is pressed) and verifies whether the association request is related to the PBC mode of the AP. In the case where the PBC mode of the AP is activated and the association request is related to the PBC mode, it can be considered to some extent that the security of the association request is relatively high. Therefore, the association request is approved and an association response is sent to the STA.

As a result, some relatively secured STAs can be automatically allowed to complete the network configuration process to connect to the AP, avoiding complicated ACL setup by the user, improving the flexibility and convenience of the AP connection, and improving user experience.

Next, an example of a network configuration process between an AP and an STA according to an embodiment of the present disclosure will be described with reference to FIGS. 3 to 7. It should be understood that the network configuration process between the AP and the STA according to the embodiment of the present disclosure may optionally be implemented as an optional function of the AP, and the user may enable or disable the function as needed.

Figure 3:
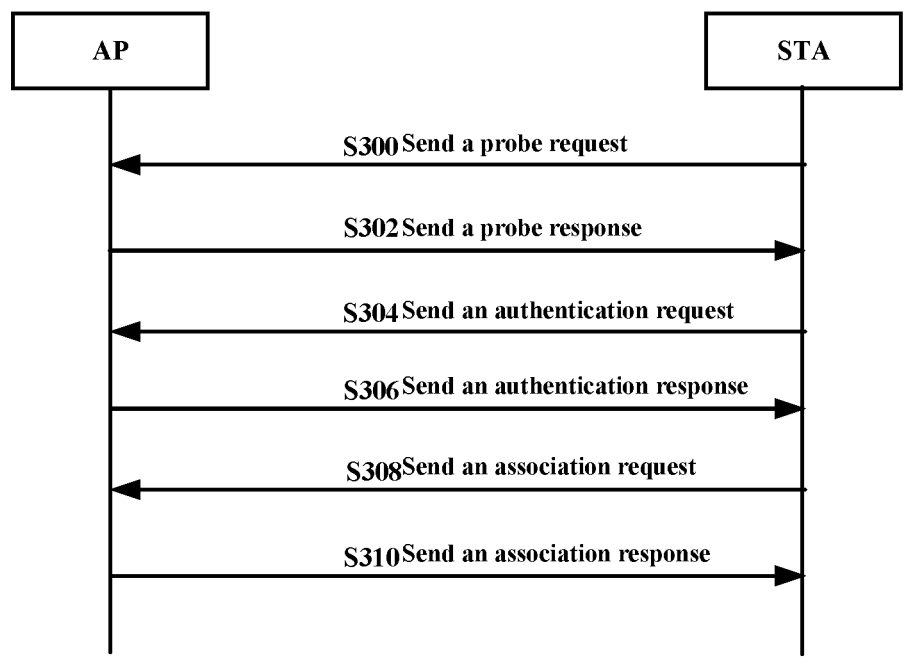
FIG. 3 is an exemplary flowchart of a network configuration process of an STA according to an embodiment of the present disclosure.

FIG. 3 is an exemplary flowchart of a network configuration process of an STA according to an embodiment of the present disclosure. Steps S300 and S302 are a probe process. In step S300, the STA sends a probe request to the AP. In step S302, the AP sends a probe response approving the probe request to the STA when certain conditions are met. Steps S304 and S306 are an authentication process. In step S304, the STA sends an authentication request to the AP. In step S306, the AP sends an authentication response indicating that authentication is successful to the STA when certain conditions are met. Steps S308 and S310 are an association process. In step S308, the STA sends an association request to the AP. In step S310, the AP sends an association response approving the association request to the STA when certain conditions are met. In addition, the network configuration process of the STA further includes a subsequent configuration process (not shown). After the STA receives the association response from the AP, in the case of a WPS-based network configuration, the WPS procedure may be further performed so that the STA can obtain the network name and password used to connect to the AP. As a result, the network configuration of the STA is completed, and the STA may use the obtained network name and password to connect to the AP.

Figure 4:
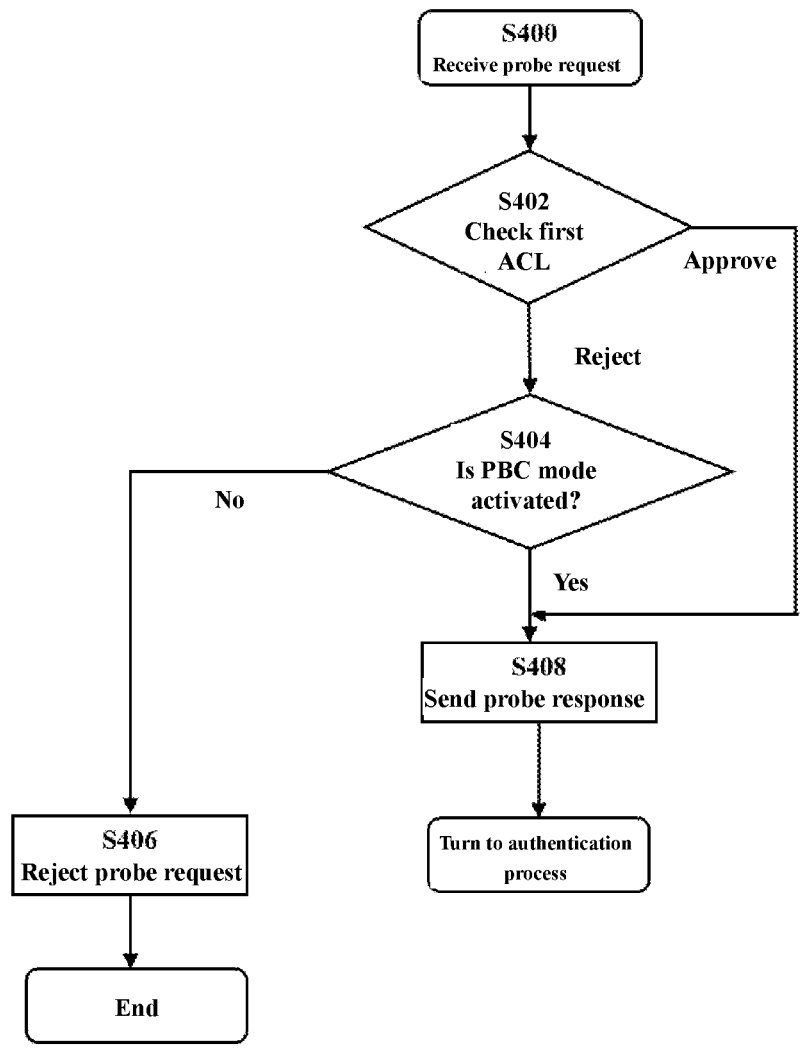
FIG. 4 is an exemplary flowchart of a probe process performed by an AP according to an embodiment of the present disclosure.
Figure 5:
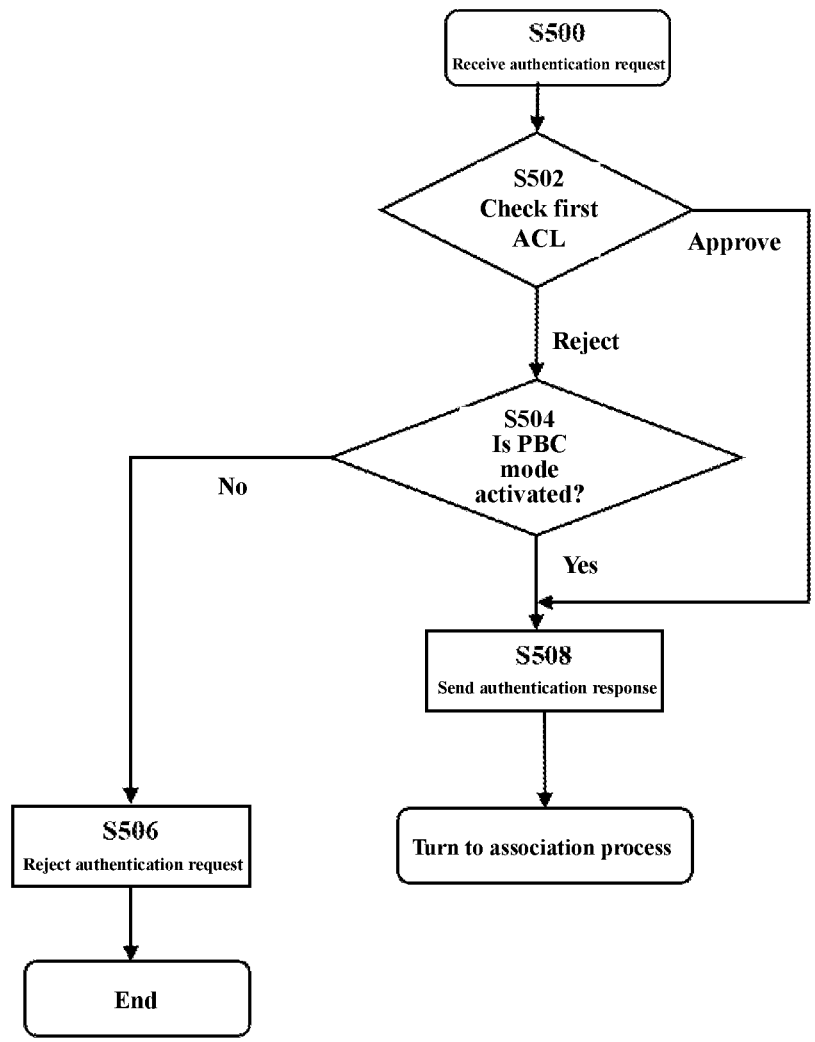
FIG. 5 is an exemplary flowchart of an authentication process performed by an AP according to an embodiment of the present disclosure.
Figure 6:
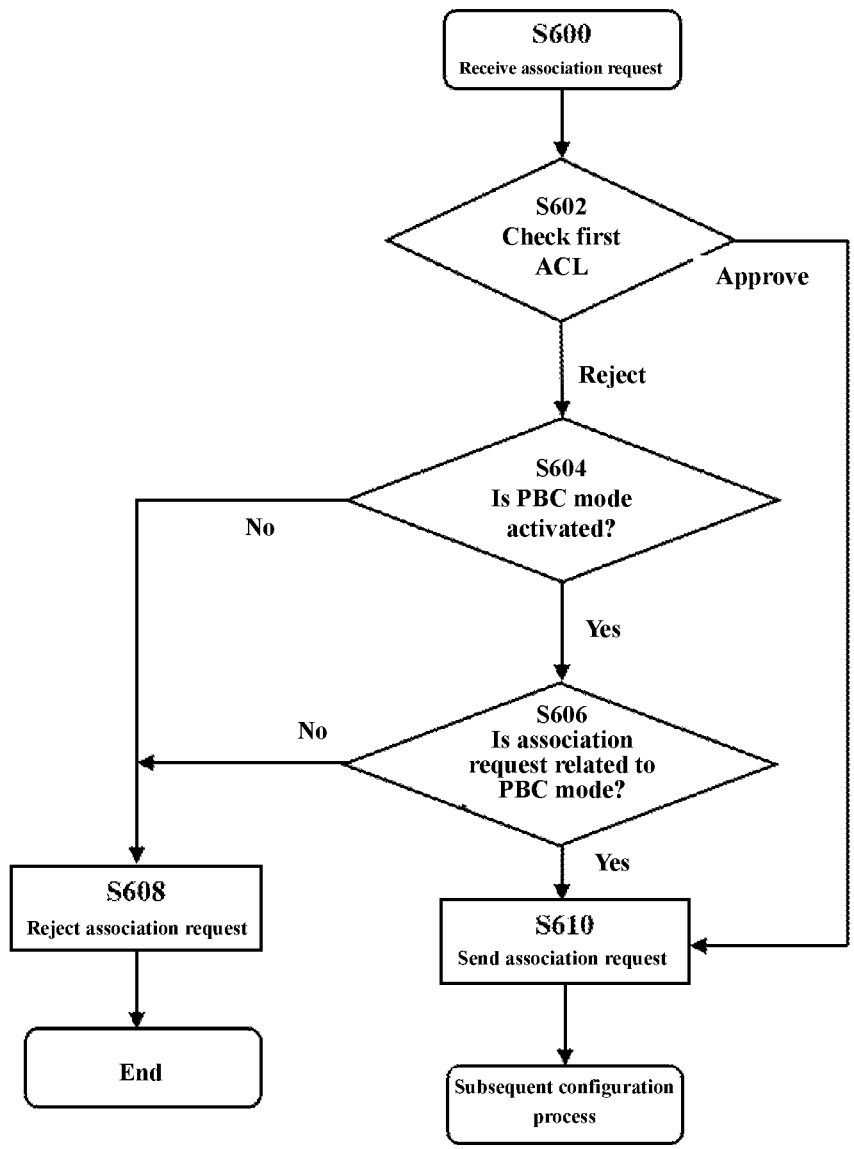
FIG. 6 is an exemplary flowchart of an association process performed by an AP according to an embodiment of the present disclosure.
Figure 7:
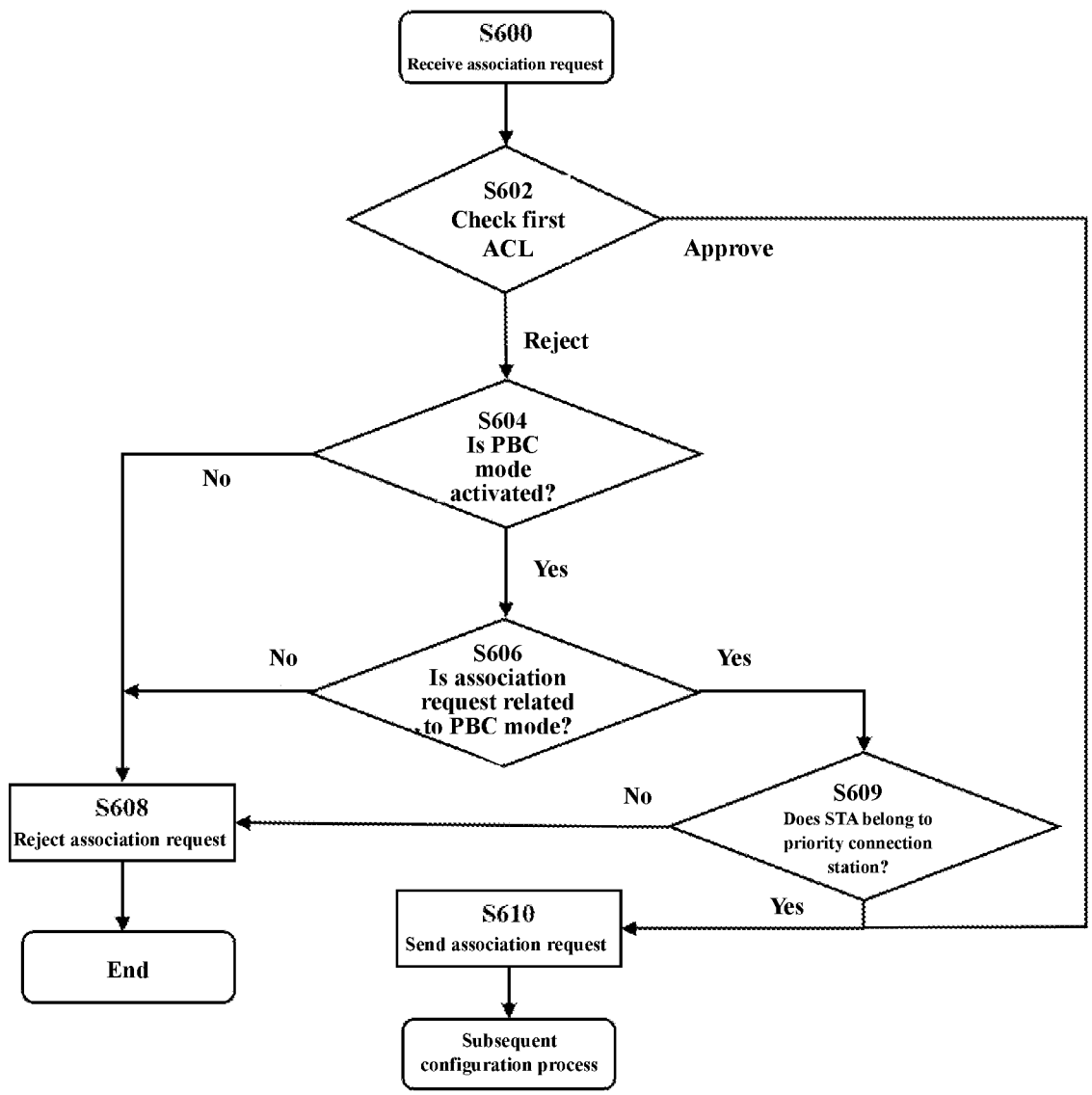
FIG. 7 is an exemplary flowchart of an association process performed by an AP according to another embodiment of the present disclosure.

FIG. 4 shows the processing performed by the AP in FIG. 3 in the probe process. FIG. 5 shows the processing performed by the AP in FIG. 3 in the authentication process. FIGS. 6 to 7 show the processing performed by the AP in FIG. 3 in the association process. In addition, the AP in FIG. 3 may correspond to the AP 100 in FIG. 1, for example, and the steps executed by the AP in FIG. 3 and the steps in FIGS. 4 to 7 may be executed by the processor 16 of the AP 100, for example.

Next, the probe process between the AP and the STA according to an embodiment of the present disclosure will be described with reference to FIG. 4.

In step S400, the AP receives a probe request from the STA.

In step S402, the AP checks the first ACL to determine whether the STA is set by the user as an STA that is to be refused access to the AP. For example, in the case where the first ACL is configured as the whitelist mode, the AP may check whether the MAC address of the STA exists in the first ACL. When it is determined that the STA is set by the user as an STA that is to be refused access to the AP after checking the first ACL in step S402 (for example, the MAC address of the STA does not exist in the first ACL configured as the whitelist mode), the STA is rejected and the process proceeds to step S404. Otherwise, the STA is allowed and the process proceeds to step S408.

Next, in step S404, the AP determines whether the PBC mode is activated. In a case where it is determined in step S404 that the PBC mode is activated, the process proceeds to step S408.

In step S408, the AP sends a corresponding probe response to the STA. Thus, the probe process is completed and it turns to the authentication process shown in FIG. 5.

In addition, in a case where it is determined that the PBC mode is not activated in step S404, the process proceeds to step S406. In step S406, the probe request from the STA is rejected and the probe process is ended.

According to the probe process of the present disclosure, it is not entirely based on the first ACL set by the user to determine whether to approve the probe request from the STA, but rather to further determine whether the PBC mode is activated. When the PBC mode is activated, it can be considered that the probe request has a high level of security, and thus the probe request is approved. Therefore, even if the user does not set the STA as an STA that allows access to the AP, the AP still can automatically approve the probe request of the STA in the PBC mode. As a result, the flexibility and convenience of the AP connection can be improved and user experience can be enhanced.

Next, the authentication process between the AP and the STA according to an embodiment of the present disclosure will be described with reference to FIG. 5. After step S408 in the probe process of FIG. 4, it turns to the authentication process shown in FIG. 5.

As shown in FIG. 5, in step S500, the AP receives an authentication request from the STA.

In step S502, the AP checks the first ACL to determine whether the STA is set by the user as an STA that is to be refused access to the AP. This step is similar to step S402 described with reference to FIG. 4. When it is determined that the STA is set by the user as an STA that is to be refused access to the AP after checking the first ACL in step S502, the STA is rejected and the process proceeds to step S504. Otherwise, the STA is allowed and the process proceeds to step S508.

Next, in step S504, it is determined whether the PBC mode is activated. In a case where it is determined in step S504 that the PBC mode is activated, the process proceeds to step S508.

In step S508, the AP sends a corresponding authentication response to the STA. Thus, the authentication process is completed and it turns to the association process shown in FIG. 6.

In addition, in a case where it is determined that the PBC mode is not activated in step S504, the process proceeds to step S506. In step S506, the authentication request from the STA is rejected and the authentication process is ended.

According to the authentication process of the present disclosure, it is not entirely based on the first ACL set by the user to determine whether to approve the authentication request from the STA, but rather to further determine whether the PBC mode is activated. When the PBC mode is activated, it can be considered that the authentication request has a high level of security, and thus the authentication request is approved. Therefore, even if the user does not set the STA as an STA that allows access to the AP, the AP still can automatically approve the authentication request of the STA in the PBC mode. As a result, the flexibility and convenience of the AP connection can be improved and user experience can be enhanced.

Next, the association process between the AP and the STA according to an embodiment of the present disclosure will be described with reference to FIG. 6. After step S508 in the authentication process of FIG. 5, it turns to the association process shown in FIG. 6.

As shown in FIG. 6, in step S600, the AP receives an association request from the STA.

In step S602, the AP checks the first ACL to determine whether the STA is set by the user as an STA that is to be refused access to the AP. This step is similar to step S402 described with reference to FIG. 4. In addition, this step may correspond to step 202 described with reference to FIG. 2, for example. When it is determined that the STA is set by the user as an STA that is to be refused access to the AP after checking the first ACL in step S602, the STA is rejected and the process proceeds to step S604. Otherwise, the STA is allowed and the process proceeds to step S610.

Next, in step S604, it is determined whether the PBC mode is activated. In a case where it is determined in step S604 that the PBC mode is activated, the process proceeds to step S606. In step S606, it is determined whether the association request is related to the PBC mode. Step S604 and step S606 may correspond to step S204 described with reference to FIG. 2. In addition, it should be understood that although steps S604 and S606 are shown to be executed sequentially in FIG. 6, the present disclosure is not limited thereto, and steps S604 and S606 may also be executed in a reverse order or in parallel.

In some embodiments, in step S606, it may be determined whether the association request is related to the PBC mode by checking whether the association request includes an information element related to the PBC mode. In a case where the association request of the STA includes an information element related to the PBC mode, it is determined that the association request of the STA is related to the PBC mode. For example, the determination of whether the association request is related to the PBC mode can include checking whether an information element (IE) related to the PBC mode, e.g., a wireless simple configuration (Wi-Fi Simple Configuration) information element (WSC IE), is present in the association request.

In some other embodiments, in step S606, it may be determined whether the association request is related to the PBC mode by checking whether the association information includes an information element related to a robust security network (RSN). When the association request of the STA includes an RSN IE, it indicates that the association request is related to password connection, and thus it can be determined that the association request is unrelated to the PBC mode. Conversely, when the association request of the STA does not include the RSN IE, it indicates that the association request is unrelated to the password connection, and thus it is determined that the association request is related to the PBC mode.

Next, if it is determined in step S604 that the PBC mode is activated and it is verified in S606 that the association request is related to the PBC mode, the process proceeds to step S610.

In step S610, the AP sends a corresponding association response to the STA. In this way, the association process is completed, and thus the subsequent configuration process can be performed to complete the network configuration so as to connect the STA to the AP. Step S610 may correspond to step S206 described with reference to FIG. 2, for example.

In addition, if it is determined in step S604 that the PBC mode is not activated, or it is verified in S606 that the association request is unrelated to the PBC mode, the process proceeds to step S608. In step S608, the association request from the STA is rejected and the association process is ended.

According to the association process of the present disclosure, it is not entirely based on the first ACL set by the user to determine whether to approve the association request from the STA, but rather to further determine whether the PBC mode is activated and whether the association request is related to the PBC mode. When the PBC mode is activated and the association request is related to the PBC mode, it can be considered that the association request has a high level of security, and thus the association request is approved. Therefore, even if the user does not set the STA as an STA that allows access to the AP, the AP still can automatically approve the association request of the STA in the PBC mode. As a result, the flexibility and convenience of the AP connection can be improved and user experience can be enhanced.

In some embodiments, priority may be set for STAs to allow STAs with high priority to connect to the AP, no matter whether these STAs are included in the first ACL set by the user. FIG. 7 shows an association process in which the priority of the STA is taken into consideration. FIG. 7 differs from FIG. 6 in that step S609 is added. Hereinafter, contents related to step S609 will be mainly described with reference to FIG. 7. Contents that are not described are similar to that of FIG. 6, and will not be repeated here.

As shown in FIG. 7, in the case where it is determined in step S604 that the PBC mode is activated and it is verified in S606 that the association request is related to the PBC mode, the process proceeds to step S609.

In step S609, it is determined whether the STA belongs to a priority connection station. In the case where it is determined in step S609 that the STA belongs to a priority connection station, the process proceeds to step S610 to send an association response to the STA. In the case where it is determined in step S609 that the STA does not belong to a priority connection station, the process proceeds to step S608 to reject the association request.

In some embodiments, the priority connection station may be set by the AP by default. For example, household electric appliances (a refrigerator, an air conditioner, etc.) in the user's home may be set as priority connection stations. In addition, devices with a high level of security such as wireless extenders used to extend the wireless coverage of APs may also be set as priority connection stations. It should be understood that the setting of the priority connection station is not limited thereto, and those of ordinary skill in the art can perform other proper settings after reading the present disclosure.

In some embodiments, as described above, the priority connection station may include a wireless extender. In this case, in step S609, the information element in the association request may be checked to determine whether the STA is a wireless extender, thereby determining whether the STA belongs to a priority connection station. In some embodiments, a multi access point information element (Multi AP IE) in an association request may be checked. The Multi AP IE is a standardized information element, and an association request sent by a wireless extender will include a Multi AP IE. Therefore, when the association request includes the Multi AP IE, it can be determined that the STA is a wireless extender. When the association request does not include the Multi AP IE, it can be determined that the STA is a normal STA instead of a wireless extender. In some embodiments, for example, in a case where the AP and the wireless extender are produced by the same company, a private information element may be constructed to indicate the wireless extender. In this case, it is possible to determine whether the STA is a wireless extender by checking whether the private information element is included in the association request. It should be understood that for other priority connection stations, a similar method or other methods known in the art may be used to determine whether the STA belongs to a priority connection station.

The WPS PBC-based network configuration process of the STA according to the embodiments of the present disclosure has been described above with reference to FIGS. 3 to 7. Through the probe, authentication, and association processes, the network configuration of the STA can be completed so as to further perform the subsequent connection process.

In some embodiments, after the network configuration of STAs is completed, the STA which has completed the network configuration process may be added to a second ACL to further optimize the access control of the AP.

Specifically, in some embodiments, after the association process in FIG. 6 is completed, the STA (for example, the MAC address of the STA) which has completed the network configuration process may be added to the second ACL and an STA in the second ACL may be allowed to perform a connection process to the AP. Therefore, in the subsequent connection process of the STA to the AP, for example, it is possible to allow all STAs in the second ACL to connect to the AP by checking the second ACL without the need of considering whether these STAs are included in the first ACL set by the user. In other words, the second ACL may have a higher priority than that of the first ACL. In the connection process of the STA to the AP, the second ACL is given priority, and it is ensured that the STA in the second ACL can connect to the AP.

In some embodiments, the first ACL may be modified according to the second ACL. For example, in the case where the first ACL is set by the user to the whitelist mode, an STA in the second ACL may be added to the first ACL. Furthermore, in the case where the first ACL is set by the user to the blacklist mode, an STA in the first ACL that is the same as an STA in the second ACL may be deleted. As a result, in the subsequent connection of the STA to the AP, since the first ACL is modified according to the second ACL, when the first ACL is checked, the probe, authentication, or association request of the STA in the second ACL can always be approved, thus ensuring that the STA in the second ACL can connect to the AP.

In some other embodiments, the modification to the first ACL may be invisible to the user. For example, the modified first ACL may be stored as a third ACL for the AP to call and check in subsequent connection of STAs to the AP. In addition, for the user, the first ACL before modification is displayed. As a result, the optimization of the access control of the AP can be performed transparently to the user, thereby further improving the user experience.

According to the present disclosure, by adding an STA, with the successful network configuration for the first time, to the second ACL, when the STA connects to the AP next time, redundant verification operations can be avoided so as to approve a connection request of the STA to the AP, thereby saving connection time and improving the connection efficiency of the STA to the AP. In addition, it is possible to set to approve any type of connection request of the STA in the second ACL (for example, connection requests based on password (PIN) mode and PBC mode in WPS, and other modes other than WPS), and it is also possible to set to only allow the STA in the second ACL to make connections based on the PBC mode. It should be understood that those of ordinary skill in the art may also set the connection authority of the STA in the second ACL as needed to approve one or more of multiple types of connection requests.

In some embodiments, after the STA, with the successful network configuration after the association process in FIG. 6 is completed, is added to the second ACL, the second ACL may be further modified according to whether the STA is a priority connection station. Specifically, during the connection process after the network configuration succeeded, the STA will again send probe, authentication, and association requests to the AP to realize the connection to the AP. In this case, the AP may determine whether the STA belongs to a priority connection station. For example, the AP may determine whether the STA belongs to a priority connection station according to the association request received from the STA during the connection process. A specific method for determining whether it belongs to a priority connection station is similar to determination method in the network configuration process described with reference to FIG. 7, and will not be repeated here.

In some embodiments, when it is determined that the STA does not belong to the priority connection station, the STA may be deleted from the second ACL. As a result, it is ensured that only the priority connection station is always stored in the second ACL, and the priority connection station is allowed to subsequently connect to the AP. For non-priority connection stations, since they have been deleted from the second ACL, in subsequent connections to the AP, it is still necessary to determine whether the STA is set by the user as an STA that is to be refused access to the AP, thereby ensuring security.

In some other embodiments, in the case where only the STAs belonging to the priority connection station are allowed to complete the association process in the association process shown in FIG. 7, it is possible to only add STAs belonging to the priority connection station to the second ACL. In this case, since the second ACL includes priority connection stations, there is no need to determine whether an STA belongs to the priority connection station again in the connection process after the network configuration succeeds, and there is no need to delete STAs in the second ACL.

The present disclosure includes the use of software, applications, computer programs, or algorithms. Software, application programs, computer programs or algorithms can be stored on a non-transient computer-readable medium, so that a computer with one or a plurality of processors can execute the aforementioned steps and the steps described in the attached drawings. For example, software or an algorithm with executable instructions may be stored on one or a plurality of memories, and one or a plurality of processors may be associated with a set of instructions for executing the software or algorithm so as to provide various functions of the cable modem termination system according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include Compact Discs (CDs), laser disks, optical disks, Digital Versatile Discs (DVDs), floppy disks, and Blu-ray disks, wherein magnetic disks usually copy data magnetically, and disks copy data optically via laser. Combinations of the above are also included in the scope of computer-readable media.

The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned realization technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

In addition, in the description of the present disclosure, the terms "first", "second", and "third" are used only for descriptive purposes and should not be understood as indication or implication of relative importance and order.

Similarly, although operations are depicted in a specific order in the attached drawings, this should not be understood as a requirement that such operations should be executed in the specific order shown or in the sequential order, or that all illustrated operations should be executed to realize the desired result. In some cases, multi-tasking and parallel processing can be advantageous.

The invention claimed is:

1. An access point, comprising:
a memory, in which instructions are stored; and
a processor, configured to execute instructions stored in the memory to execute at least the following processing:
in response to an association request received from a user station, checking a first access control list set by a user to determine whether the user station is set by the user as a user station that is to be refused access to the access point;
in response to determination that the user station is set by the user as a user station that is to be refused access to the access point, determining whether a push button configuration mode of a wireless protection setup of the access point is activated and verifying whether the association request is related to the push button configuration mode;
in response to determination that the push button configuration mode of the access point is activated and the association request of the user station is related to the push button configuration mode, sending an association response to the user station to complete a network configuration process of the user station;
adding the user station which has completed the network configuration process to a second access control list; and
allowing the user station in the second access control list to perform a connection process to the access point.

2. The access point according to claim 1, wherein the processor is further configured to execute instructions stored in the memory to perform at least the following processing:
in response to a probe request from the user station, checking the first access control list to determine whether the user station is set by the user as a user station that is to be refused access to the access point; and
in response to determination that the user station is set by the user as a user station that is to be refused access to the access point, sending a probe response to the user station in a case where the push button configuration mode of the access point is activated.

3. The access point according to claim 1, wherein the processor is further configured to execute instructions stored in the memory to perform at least the following processing:
in response to an authentication request received from the user station, checking the first access control list to determine whether the user station is set by the user as a user station that is to be refused access to the access point; and
in response to determination that the user station is set by the user as a user station that is to be refused access to the access point, sending an authentication response to the user station in a case where the push button configuration mode of the access point is activated.

4. The access point according to claim 1, wherein the processor is further configured to execute instructions stored in the memory to perform at least the following processing:
modifying the first access control list according to the second access control list.

5. The access point according to claim 4, wherein the processor is further configured to execute instructions stored in the memory to perform at least the following processing:
adding the user station in the second access control list to the first access control list in a case where the first access control list is set by the user as a whitelist mode; and
deleting the user station in the first access control list that is the same as the user station in the second access control list in a case where the first access control list is set by the user as a blacklist mode.

6. The access point according to claim 1, wherein the processor is further configured to execute instructions stored in the memory to perform at least the following processing:
determining whether the user station belongs to a priority connection station; and
sending the association response to the user station only in a case where it is determined that the user station belongs to a priority connection station.

7. The access point according to claim 1, wherein the processor is further configured to execute instructions stored in the memory to perform at least the following processing:
determining whether the user station belongs to a priority connection station; and
in response to determination that the user station does not belong to a priority connection station, deleting the user station from the second access control list.

8. The access point according to claim 6, wherein the priority connection station includes a wireless extender, and the processor is further configured to execute instructions stored in the memory to perform at least the following processing:

in a case where an association request of the user station includes a multi access point information element, determining that the user station is a wireless extender belonging to the priority connection station.

9. The access point according to claim 1, wherein the processor is further configured to execute instructions stored in the memory to perform at least the following processing:

in a case where an association request of the user station includes an information element related to the push button configuration mode, or in a case where the association request of the user station does not include an information element related to a robust security network, determining that the association request of the user station is related to the push button configuration mode.

10. A method for an access point, wherein the method comprises:

in response to an association request received from a user station, checking a first access control list set by a user to determine whether the user station is set by the user as a user station that is to be refused access to the access point;

in response to determination that the user station is set by the user as a user station that is to be refused access to the access point, determining whether a push button configuration mode of a wireless protection setup of the access point is activated and verifying whether the association request is related to the push button configuration mode;

in response to determination that the push button configuration mode of the access point is activated and the association request of the user station is related to the push button configuration mode, sending an association response to the user station to complete a network configuration process of the user station;

adding the user station which has completed the network configuration process to a second access control list; and allowing the user station in the second access control list to perform a connection process to the access point.

11. The method according to claim 10, further comprising:

in response to a probe request received from the user station, checking the first access control list to determine whether the user station is set by the user as a user station that is to be refused access to the access point; and in response to determination that the user station is set by the user as a user station that is to be refused access to the access point, sending a probe response to the user station in a case where the push button configuration mode of the access point is activated.

12. The method according to claim 10, further comprising:

in response to an authentication request received from the user station, checking the first access control list to determine whether the user station is set by the user as a user station that is to be refused access to the access point; and in response to determination that the user station is set by the user as a user station that is to be refused access to the access point, sending an authentication response to the user station in a case where the push button configuration mode of the access point is activated.

13. The method according to claim 10, further comprising:

modifying the first access control list according to the second access control list.

14. A non-transitory computer readable medium for use with a processor, wherein the non-transitory computer readable medium has instructions stored therein, which, when executed by the processor, perform at least the following processing:

in response to an association request received from a user station, checking a first access control list set by a user to determine whether the user station is set by the user as a user station that is to be refused access to an access point;

in response to determination that the user station is set by the user as a user station that is to be refused access to the access point, determining whether a push button configuration mode of a wireless protection setup of the access point is activated and verifying whether the association request is related to the push button configuration mode;

in response to determination that the push button configuration mode of the access point is activated and the association request of the user station is related to the push button configuration mode, sending an association response to the user station to complete a network configuration process of the user station;

adding the user station which has completed the network configuration process to a second access control list; and allowing the user station in the second access control list to perform a connection process to the access point.

15. The non-transitory computer readable medium according to claim 14, wherein the instructions, when executed by the processor, further perform at least the following processing:

in response to a probe request received from the user station, checking the first access control list to determine whether the user station is set by the user as a user station that is to be refused access to the access point; and in response to determination that the user station is set by the user as a user station that is to be refused access to the access point, sending a probe response to the user station in a case where the push button configuration mode of the access point is activated.

16. The non-transitory computer readable medium according to claim 14, wherein in response to an authentication request received from the user station, checking the first access control list to determine whether the user station is set by the user as a user station that is to be refused access to the access point; and in response to determination that the user station is set by the user as a user station that is to be refused access to the access point, sending an authentication response to the user station in a case where the push button configuration mode of the access point is activated.

17. The non-transitory computer readable medium according to claim 14, wherein the instructions, when executed by the processor, further perform at least the following processing:

modifying the first access control list according to the second access control list.

* * * * *